R. Wilson,
Pipe Coupling.
No. 59,702. Patented Nov. 13, 1866.

Witnesses:

Inventor:
R. Wilson
by Munn & Co.
Attys.

UNITED STATES PATENT OFFICE.

RICHARD WILSON, OF COLD SPRING, NEW YORK.

IMPROVEMENT IN GAS-PIPE JOINTS.

Specification forming part of Letters Patent No. 59,702, dated November 13, 1866.

*To all whom it may concern:*

Be it known that I, RICHARD WILSON, of Cold Spring, county of Putnam, and State of New York, have invented a new and Improved Swinging Joint for Gas-Pipes; and I do hereby declare that the following is a full, clear, and exact description thereof, which will enable others skilled in the art to make and use the same, reference being had to the accompanying drawings, forming part of this specification, in which—

Figure 1:
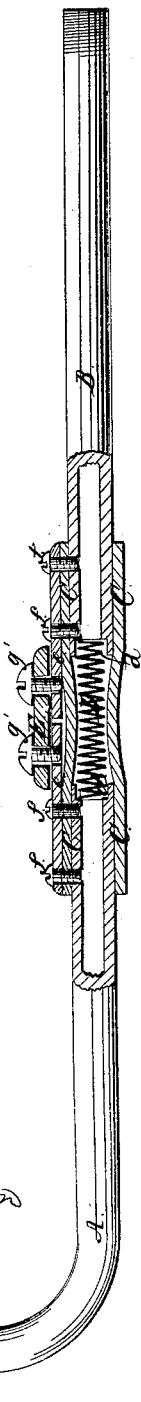
Figure 2:

Figure 1 is a vertical longitudinal section taken in the line $x\,x$, Fig. 2. Fig. 2 is a top view.

Similar letters of reference in the different figures indicate corresponding parts.

This invention relates to a new and improved flexible joint for gas-pipes; and consists in uniting two ends of a pipe with a short sleeve of rubber and placing in the bore of the sleeve and between the ends of the pipe a spiral spring, to prevent the rubber pipe or sleeve from collapsing; and also in providing in connection therewith a metallic hinge, to give the joint rigidity in one direction, as hereinafter fully set forth.

A is the swinging part of a gas-pipe, and B is the stationary part of the same. $a$ is the gas-burner.

C C is a short rubber sleeve, which connects the two parts A B of the pipe and covers the joint between the same, so that the bore of the pipes is carried uninterruptedly across the joint.

D, Fig. 1, is a spiral spring, which prevents the flexible joint or sleeve C from collapsing, especially when A is turned considerably out of line with B. This spring D is held in place by forming a rabbet or shoulder, $d$, in the adjacent ends of the pipe, and placing the ends of the spring in against the said rabbet or shoulder, as shown in Fig. 1.

To prevent the outer portion, A, of a horizontal gas-pipe from dropping, an arm, $e$, Fig. 1, is secured to each of the pipes A B at the joint by means of the screws $f\,f$, and then these arm $e\,e$ connected to each other by a link, E, and screws $g\,g$, and this gives the swinging portion A vertical rigidity, while it is free to move horizontally.

The hinge E $e\,e$ may be dispensed with in hanging pipes, and the flexible joint will allow the swinging part of the pipe to be turned up out of the way when not in use. This joint is quite free from wear which can cause leakage, and is durable and inexpensive.

Having thus described my invention, what I claim as new, and desire to secure by Letters Patent, is—

1. The hinge E, spiral spring D, elastic sleeve C, and swinging pipe A, in combination with the pipe B, substantially as and for the purpose set forth.

2. The rubber sleeve C, spiral spring D, and swinging pipe A, in combination with the fixed gas-pipe B, substantially in the manner and for the purpose specified.

The above specification of my invention signed by me this 6th day of March, 1866.

R. WILSON.

Witnesses:
M. M. LIVINGSTON,
ALEX. F. ROBERTS.